United States Patent
Agnew et al.

(10) Patent No.: US 11,885,100 B2
(45) Date of Patent: Jan. 30, 2024

(54) QUAD TRACK SKID-STEER LOADER

(71) Applicant: Clark Equipment Company, West Fargo, ND (US)

(72) Inventors: Dennis Agnew, Moffit, ND (US); Matthew Sagaser, Bismarck, ND (US); David A. Owens, Bismarck, ND (US)

(73) Assignee: DOOSAN BOBCAT NORTH AMERICA INC., West Fargo, ND (US)

( * ) Notice: Subject to any disclaimer, the term of this patent is extended or adjusted under 35 U.S.C. 154(b) by 214 days.

(21) Appl. No.: 16/432,553

(22) Filed: Jun. 5, 2019

(65) Prior Publication Data

US 2019/0368162 A1 Dec. 5, 2019

Related U.S. Application Data

(60) Provisional application No. 62/680,799, filed on Jun. 5, 2018.

(51) Int. Cl.
*B62D 55/04* (2006.01)
*E02F 9/20* (2006.01)
(Continued)

(52) U.S. Cl.
CPC ................ *E02F 9/20* (2013.01); *E02F 3/283* (2013.01); *E02F 3/36* (2013.01); *E02F 9/02* (2013.01)

(58) Field of Classification Search
CPC ..... E02F 9/20; E02F 3/283; E02F 3/36; E02F 9/02; E02F 3/3414; E02F 9/2253;
(Continued)

(56) References Cited

U.S. PATENT DOCUMENTS 3,435,908 A 4/1969 Sunderlin et al.
3,635,365 A * 1/1972 Bauer .................... E02F 9/2253
414/715

(Continued)

FOREIGN PATENT DOCUMENTS

EP 3053811 A1 8/2016
WO 2008/073456 A2 6/2008
WO 2015/162341 A1 10/2015

OTHER PUBLICATIONS

International Search Report and Written Opinion dated Feb. 3, 2020 for International Application No. PCT/US2019/035586 filed Jun. 5, 2019, 17 pages.

(Continued)

*Primary Examiner* — Edwin J Toledo-Duran
(74) *Attorney, Agent, or Firm* — John Veldhuis-Kroeze; Westman, Champlin & Koehler, P.A.

(57) ABSTRACT

Disclosed embodiments are directed to quad track skid-steer loaders and power machines having a frame, a cab, and a lift arm assembly pivotally coupled to the frame rearward of at least a portion of the cab and extending forward of the frame. A first axle assembly and a second axle assembly on a first side of the frame mount first and second track assemblies. A third axle assembly and a fourth axle assembly on a second side of the frame mount third and fourth track assemblies. A first drive motor rotates the first and second axles to drive the first and second track assemblies and a second drive motor rotates the third and fourth axles to drive the third and fourth track assemblies.

11 Claims, 10 Drawing Sheets

(51) Int. Cl.
*E02F 3/28* (2006.01)
*E02F 3/36* (2006.01)
*E02F 9/02* (2006.01)

(58) Field of Classification Search
CPC .... B62D 55/065; B62D 55/084; B62D 55/04; B62D 11/08; B60P 1/50; B60K 17/10; B60K 17/02; B60K 17/342; F16H 47/02
See application file for complete search history.

(56) References Cited

U.S. PATENT DOCUMENTS

| | | | | |
|---|---|---|---|---|
| 3,866,700 | A * | 2/1975 | Bauer | F16H 61/437 |
| | | | | 60/428 |
| 3,869,010 | A | 3/1975 | Stedman | |
| 4,493,385 | A * | 1/1985 | Shiber | B62D 11/08 |
| | | | | 180/6.2 |
| 4,878,437 | A * | 11/1989 | Myers | B61K 9/06 |
| | | | | 105/451 |
| 4,962,821 | A | 10/1990 | Kim | |
| 4,966,242 | A * | 10/1990 | Baillargeon | B62D 55/0655 |
| | | | | 280/421 |
| 5,533,587 | A * | 7/1996 | Dow | B62D 11/20 |
| | | | | 180/245 |
| 6,007,166 | A | 12/1999 | Tucker et al. | |
| 6,283,562 | B1 | 9/2001 | Tsubota et al. | |
| 6,363,630 | B1 * | 4/2002 | Ziegler | B62D 11/08 |
| | | | | 180/19.3 |
| 7,044,263 | B2 * | 5/2006 | Fischbach | F16H 25/24 |
| | | | | 180/443 |
| 7,617,881 | B2 | 11/2009 | Radke et al. | |
| 8,430,188 | B2 * | 4/2013 | Hansen | B62D 11/20 |
| | | | | 180/9.26 |
| 9,586,635 | B2 | 3/2017 | Sewell | |
| 9,650,088 | B2 | 5/2017 | Haar et al. | |
| 10,029,565 | B1 * | 7/2018 | Keller | B62D 7/16 |
| 2007/0090625 | A1 * | 4/2007 | Skiles | B62D 13/02 |
| | | | | 280/442 |
| 2007/0107950 | A1 * | 5/2007 | Ki | B62D 55/14 |
| | | | | 305/132 |
| 2008/0164078 | A1 * | 7/2008 | Rhodes | B62D 21/14 |
| | | | | 342/357.395 |
| 2009/0308669 | A1 | 12/2009 | Vos et al. | |
| 2010/0012399 | A1 * | 1/2010 | Hansen | B62D 55/30 |
| | | | | 180/9.26 |
| 2010/0139994 | A1 | 6/2010 | Hansen | |
| 2011/0227309 | A1 * | 9/2011 | Arulraja | E02F 9/024 |
| | | | | 280/124.116 |
| 2012/0217080 | A1 * | 8/2012 | Besler | B60K 1/02 |
| | | | | 29/428 |
| 2014/0158440 | A1 | 6/2014 | Haar et al. | |
| 2014/0338991 | A1 | 11/2014 | Hansen | |
| 2015/0122144 | A1 * | 5/2015 | Snyder | E01B 25/00 |
| | | | | 104/249 |
| 2015/0259185 | A1 * | 9/2015 | Ditty | B66F 11/046 |
| | | | | 182/19 |
| 2016/0332554 | A1 * | 11/2016 | Ambrosio | G05D 1/024 |
| 2016/0347364 | A1 | 12/2016 | Eavenson, Sr. et al. | |
| 2017/0096181 | A1 * | 4/2017 | Canossa | B62D 55/084 |
| 2017/0232811 | A1 * | 8/2017 | Smith | B60B 35/04 |
| | | | | 280/124.116 |
| 2017/0233002 | A1 * | 8/2017 | Smith | B60B 11/02 |
| | | | | 280/80.1 |
| 2017/0259848 | A1 * | 9/2017 | Smith | B62D 13/02 |
| 2019/0176914 | A1 * | 6/2019 | Boivin | B62D 55/04 |
| 2020/0062059 | A1 * | 2/2020 | Watling | B63H 25/42 |
| 2020/0223480 | A1 * | 7/2020 | Pepin | B62D 55/065 |

OTHER PUBLICATIONS

Invitation To Pay Additional Fees And, Where Applicable, Protest Fee for International Application No. PCT/US2019/035586 filed Jun. 5, 2019, 13 pages.

* cited by examiner

QUAD TRACK SKID-STEER LOADER

CROSS-REFERENCE TO RELATED APPLICATION

This application claims the benefit of U.S. Provisional Application No. 62/680,799, which was filed on Jun. 5, 2018.

BACKGROUND

This disclosure is directed toward power machines. More particularly, this disclosure is directed to skid-steer loaders having a single drive motor per side driving front and rear tracks. The disclosure is also directed to kits for converting wheeled skid-steer loaders having a single drive motor per side into a quad track skid-steer loader.

Power machines, for the purposes of this disclosure, include any type of machine that generates power for the purpose of accomplishing a particular task or a variety of tasks. One type of power machine is a work vehicle. Work vehicles are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

Compact track loaders typically have a track on each side of the machine and utilize a drive motor to drive a sprocket coupled to the track on each side to implement travel and steering of the power machine. Steering is accomplished by operating the track on each side at a different speed and/or direction from each other. Wheeled skid-steer loaders (often commonly referred to simply as "skid-steer loaders") have four axles, and wheels are mountable on each axle. Each side of the skid-steer loader has a single drive motor driving both axles/wheels on that side of the machine. Compact track loaders and skid-steer loaders each provide certain advantages relative to the other. For example, track loaders can reduce soil compaction relative to skid-steer loaders. As another example, skid-steer loaders are often lighter than track loaders, making them easier to transport. There are other advantages of each type.

The discussion above is merely provided for general background information and is not intended to be used as an aid in determining the scope of the claimed subject matter.

SUMMARY

Disclosed are quad track skid-steer loaders and methods of converting a wheeled skid-steer loader into a quad track skid-steer loader. In disclosed embodiments, track assemblies are mounted on each of the axles of a skid-steer loader, and a single drive motor drives or powers both of the track assemblies on a particular side of the loader.

In some exemplary embodiments, a power machine (100, 200, 300, 400) such as a skid steer loader is disclosed and includes a frame (110, 210, 310), a cab (250) mounted on the frame, and a lift arm assembly (230, 330) pivotally coupled to the frame rearward of at least a portion of the cab and extending forward of the frame. The power machine has a first axle assembly (227A, 327A, 427A) and a second axle assembly (227B, 327B, 427B) both on a first side of the frame, a first track assembly (419A) mounted to the first axle assembly and a second track assembly (419B) mounted to the second axle assembly on the first side of the frame. A first drive motor (226A) is coupled to the first and second axle assemblies and configured to rotate the first and second axles to drive the first and second track assemblies. The power machine also includes a third axle assembly (227C, 327C, 427C) and a fourth axle (227D, 327D, 427D) both on a second side of the frame, a third track assembly (419C) mounted to the third axle assembly and a fourth track assembly (419D) mounted to the fourth axle assembly on the second side of the frame. A second drive motor (226B) is coupled to the third and fourth axle assemblies and is configured to rotate the third and fourth axles to drive the third and fourth track assemblies.

In some exemplary embodiments, the power machine further comprises a first drive pump (224A) selectively controllable to provide a power signal to the first drive motor and a second drive pump selectively controllable to provide a power signal to the second drive motor. Also in some embodiment, each of the track assemblies includes a track frame (430) providing an axle interface (432) configured to be mounted over or attached to a corresponding one of the axles, a track (434) supported by the track frame, a sprocket (436) configured to drive the track around the track frame, and at least two idlers (438, 440) configured to tension the track on the track frame (430).

In some exemplary embodiments, the power machine further comprises a plurality of hubs (530) each mounted to a different one of a first axle, a second axle, a third axle and a fourth axle. Each of the plurality of hubs is configured to mount, one at a time, both of a wheel (219A, 219B, 219C, 219D; 319A, 319B, 319C, 319D) and a track assembly (419A, 419B, 419C, 419D) to the corresponding axle such that the power machine can be changed between using wheel type tractive elements and track assembly type tractive elements.

In some exemplary embodiments, the power machine further comprises a plurality of anti-rotation devices (536) each mounted to a different one of the first axle, second axle, third axle and fourth axle. Each of the plurality of anti-rotation devices is configured to limit overall rotation of a track (434) of a corresponding track assembly mounted on the corresponding axle. Further, in some exemplary embodiments, each of the plurality of anti-rotation devices is configured to be removably mounted to the corresponding axle such that the anti-rotation device can be removed when a wheel is mounted on the corresponding axle instead of a track assembly.

In some exemplary embodiments, a power machine (100, 200, 300, 400) is disclosed and includes a frame (110, 210, 310), and a lift arm assembly (230, 330) pivotally coupled to the frame rearward of at least a portion of the cab and extending forward of the frame. The power machine includes a first axle assembly (227A, 327A, 427A) and a second axle assembly (227B, 327B, 427B) both on a first side of the frame, and a third axle (227C, 327C, 427C) and a fourth axle (227D, 327D, 427D) both on a second side of the frame. The power machine also includes a plurality of hubs (530) each mounted to a different one of the first axle, second axle, third axle and fourth axle. Each of the hubs is configured to mount, one at a time, both of a wheel type tractive element (219A, 219B, 219C, 219D; 319A, 319B, 319C, 319D) and a track assembly type tractive element (419A, 419B, 419C, 419D) to the corresponding axle such that the power machine can be changed between using the wheel type tractive elements and the track assembly type tractive elements. The power machine also includes a first drive motor (226A) coupled to the first and second axles and configured to rotate the first and second axles to drive the wheel type tractive elements or track type tractive elements mounted to the first and second axles, and a second drive motor (226B) coupled to the third and fourth axles and configured to rotate the third and fourth axles to drive the wheel type tractive elements or track type tractive elements mounted to the third and fourth axles.

In some embodiments, the power machine further includes a plurality of anti-rotation devices (536) each mounted to a different one of the first axle, second axle, third axle and fourth axle, wherein each of the plurality of anti-rotation devices is configured limit overall rotation of a track (434) of a track assembly type tractive element mounted on the corresponding axle. Further, in some exemplary embodiments, each of the plurality of anti-rotation devices is configured to be removably mounted to the corresponding axle such that the anti-rotation device can be removed when a wheel is mounted on the corresponding axle instead of a track assembly.

In some exemplary embodiments, a power machine (100, 200, 300, 400) is disclosed and includes a frame (110, 210, 310), a cab (250) mounted on the frame, and a lift arm assembly (230, 330) pivotally coupled to the frame rearward of at least a portion of the cab and extending forward of the frame. The power machine includes a first axle (227A, 327A, 427A) and a second axle (227B, 327B, 427B) both on a first side of the frame, and a third axle (227C, 327C, 427C) and a fourth axle (227D, 327D, 427D) both on a second side of the frame. The power machine also includes a plurality of hubs (530) each mounted to a different one of a first axle, a second axle, a third axle and a fourth axle. Each of the hubs is configured to mount, one at a time, both of a wheel type tractive element (219A, 219B, 219C, 219D; 319A, 319B, 319C, 319D) and a track assembly type tractive element (419A, 419B, 419C, 419D) to the corresponding axle such that the power machine can be changed between using the wheel type tractive elements and the track assembly type tractive elements. Further, the power machine includes a first variable displacement drive motor (226A) coupled to the first and second axles and configured to rotate the first and second axles to drive the wheel type tractive elements or track assembly type tractive elements mounted to the first and second axles and a second variable displacement drive motor (226B) coupled to the third and fourth axles and configured to rotate the third and fourth axles to drive the wheel type tractive elements or track assembly type tractive elements mounted to the third and fourth axles. Further, the power machine comprises a displacement controller (262) configured to control the first and second variable displacement drive motors using a first displacement control scheme when wheel type tractive elements are mounted to the axles, and to control the first and second variable displacement drive motors using a second displacement control scheme when track assembly type tractive elements are mounted to the axles.

In some exemplary embodiments, the displacement controller is configured to control the first and second variable displacement drive motors using the first displacement control scheme when wheel type tractive elements are mounted to the axles to prevent variable displacement of the first and second variable displacement drive motors, and to control the first and second variable displacement drive motors using the second displacement control scheme when track assembly type tractive elements are mounted to the axles to allow variable displacement of the first and second variable displacement drive motors.

In some exemplary embodiments, the first displacement control scheme limits the first and second variable displacement drive motors to low range, high displacement operation. In some exemplary embodiments, the second displacement control scheme allows both low range, high displacement operation and high range, low displacement operation of the first and second variable displacement drive motors.

In some exemplary embodiments, the power machine further comprises a user input (264) in communication with the displacement controller and configured to allow an operator to indicate a type of tractive element mounted on the axles to control which of the first and second displacement control schemes is implemented by the displacement controller.

This Summary and the Abstract are provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

DETAILED DESCRIPTION

The concepts disclosed in this discussion are described and illustrated with reference to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

Disclosed embodiments include track assemblies configured to each replace each wheel of a skid-steer loader with a track assembly so as to convert the skid-steer loader to a quad track skid-steer loader. The track assemblies are configured to be mounted onto the skid-steer loader axle assemblies. Also disclosed are quad track skid-steer loaders with each of four tracks mounted to a different one of four axle assemblies of the loader, and with a single drive motor per side of the loader driving both of the corresponding two track assemblies mounted on axle assemblies of that side.

Figure 2:
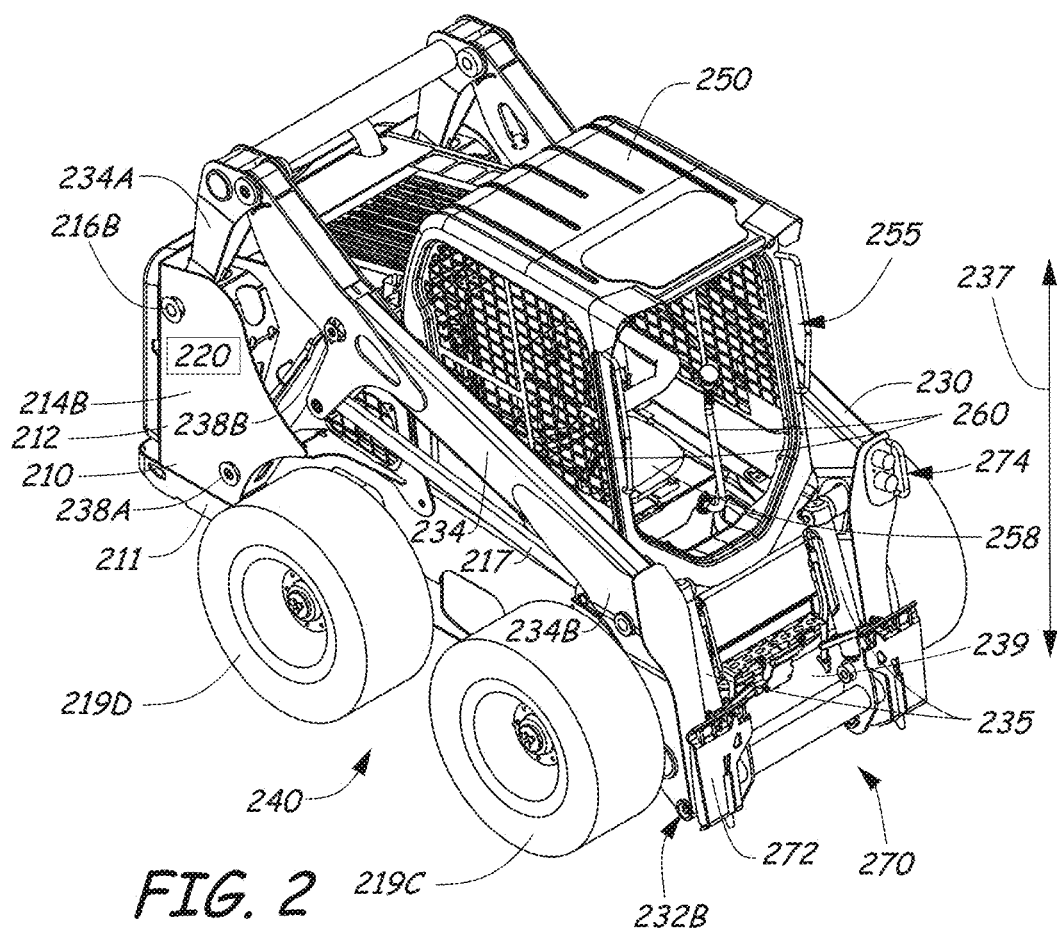
FIGS. 2-3 illustrate perspective views of a representative power machine in the form of a skid-steer loader of the type on which the disclosed embodiments can be practiced.
Figure 3:
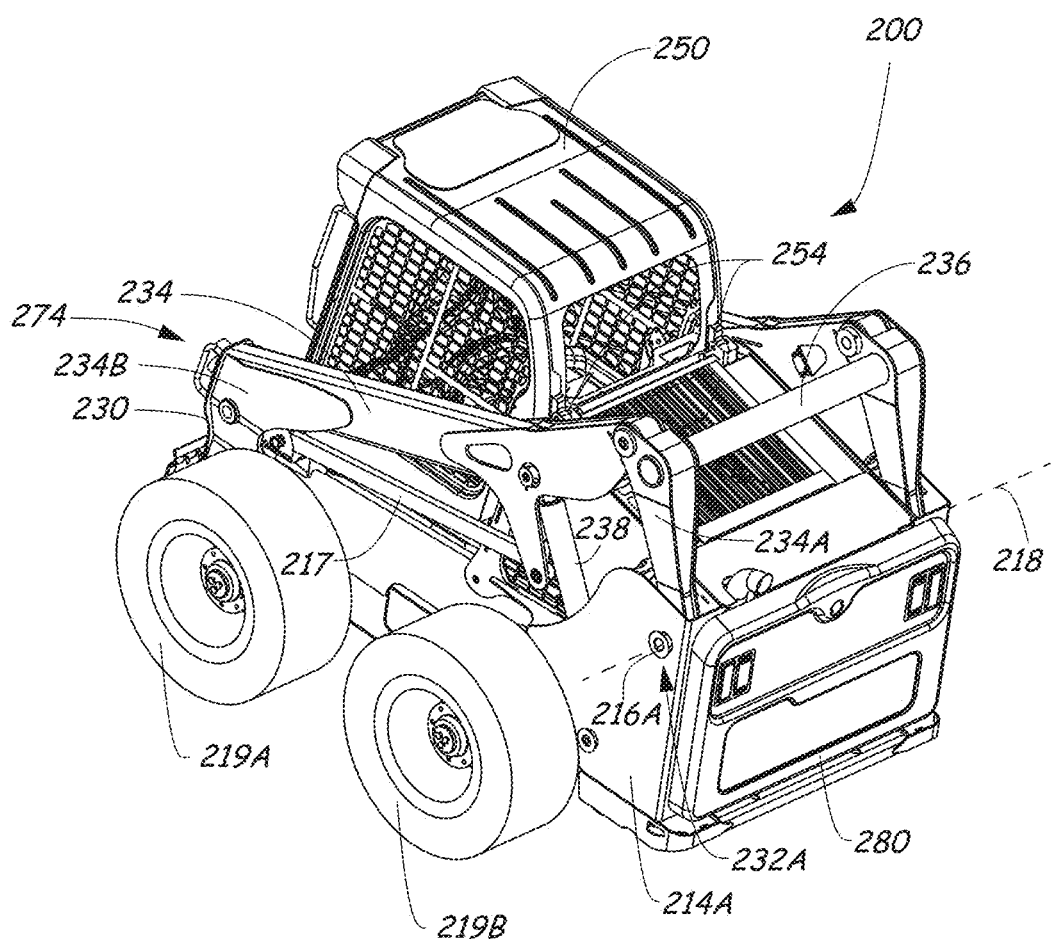

These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is illustrated and discussed as being a representative power machine. However, as mentioned above, the embodiments below can be practiced on any of a number of power machines, including power machines of different types from the representative power machine shown in FIGS. 2-3. Power machines, for the purposes of this discussion, include a frame, at least one work element, and a power source that is capable of providing power to the work element to accomplish a work task. One type of power machine is a self-propelled work vehicle. Self-propelled work vehicles are a class of power machines that include a frame, work element, and a power source that is capable of providing power to the work element. At least one of the work elements is a motive system for moving the power machine under power.

Figure 1:
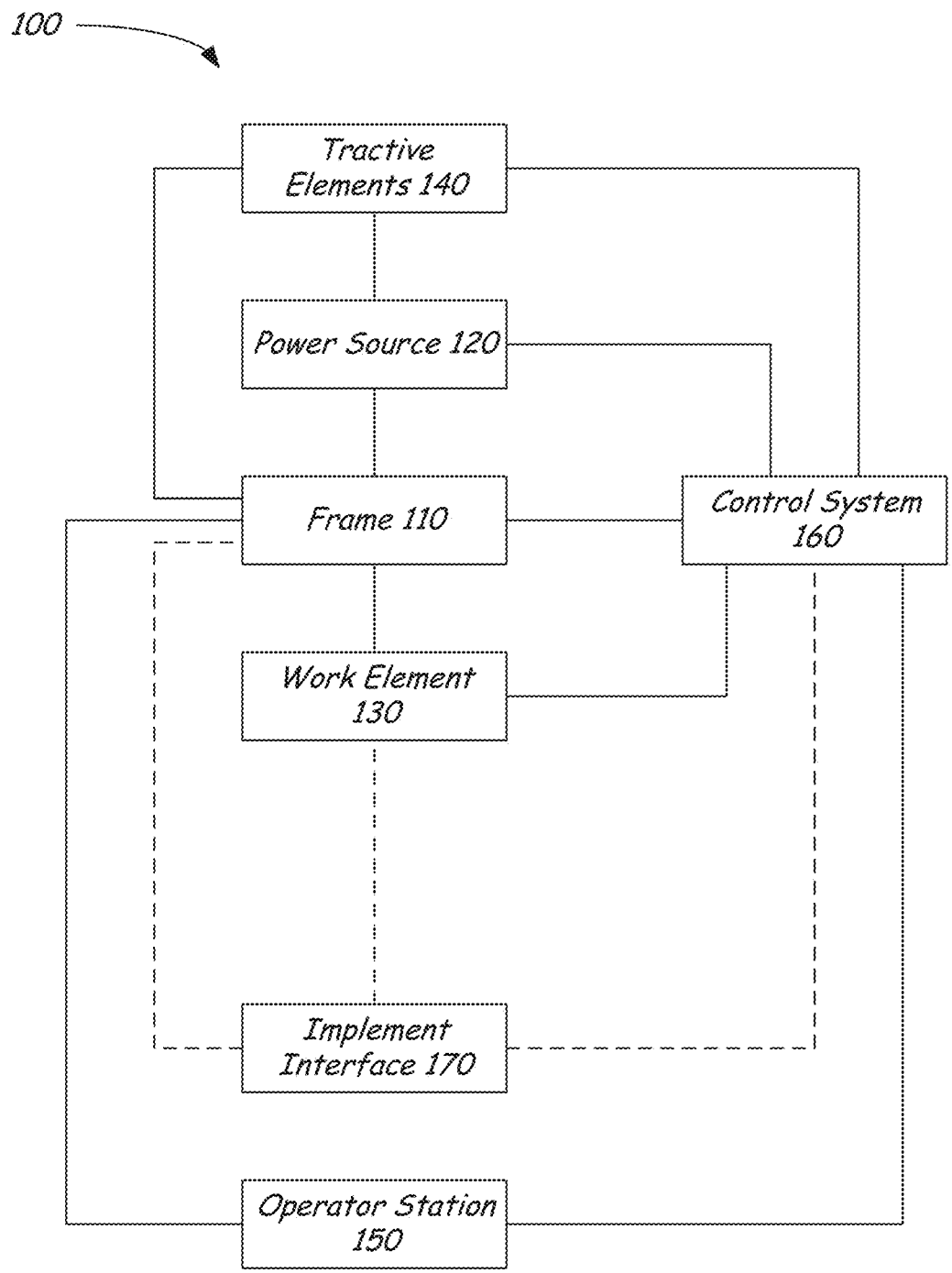
FIG. 1 is a block diagram illustrating functional systems of a representative power machine on which embodiments of the present disclosure can be advantageously practiced.

FIG. 1 is a block diagram that illustrates the basic systems of a power machine 100, which can be any of a number of different types of power machines, upon which the embodiments discussed below can be advantageously incorporated. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that are capable of performing a dedicated task. For example, some work vehicles have a lift arm to which an implement such as a bucket is attached such as by a pinning arrangement. The work element, i.e., the lift arm can be manipulated to position the implement for the purpose of performing the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that is capable of moving with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is configured to provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is configured to convert the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle assembly, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e. from a remotely located operator station) instead of or in addition to an operator station adjacent or on the power machine. This can include applications where at least some of the operator controlled functions of the power machine can be operated from an operating position associated with an implement that is coupled to the power machine. Alternatively, with some power machines, a remote control device can be provided (i.e. remote from both of the power machine and any implement to which is it coupled) that is capable of controlling at least some of the operator controlled functions on the power machine.

FIGS. 2-3 illustrate a loader 200, which is one particular example of a power machine of the type illustrated in FIG. 1 where the embodiments discussed below can be advantageously employed. Loader 200 is a skid-steer loader, which is a loader that has tractive elements (in this case, four wheels) that are mounted to the frame of the loader via rigid axles. Here the phrase "rigid axles" refers to the fact that the skid-steer loader 200 does not have any tractive elements that can be rotated or steered to help the loader accomplish a turn. Instead, a skid-steer loader has a drive system that independently powers one or more tractive elements on each side of the loader so that by providing differing tractive signals to each side, the machine will tend to skid over a support surface. These varying signals can even include powering tractive element(s) on one side of the loader to move the loader in a forward direction and powering tractive element(s) on another side of the loader to mode the loader in a reverse direction so that the loader will turn about a radius centered within the footprint of the loader itself. The term "skid-steer" has traditionally referred to loaders that have skid steering as described above with wheels as tractive elements. However, it should be noted that many track loaders also accomplish turns via skidding and are technically skid-steer loaders, even though they do not have wheels. For the purposes of this discussion, unless noted otherwise, the term skid-steer should not be seen as limiting the scope of the discussion to those loaders with wheels as tractive elements.

Loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. Skid-steer loader 200 is described herein to provide a reference for understanding one environment on which the embodiments described below related to track assemblies and mounting elements for mounting the track assemblies to a power machine may be practiced. The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220, the power system being capable of generating or otherwise providing power for operating various functions on the power machine. Power system 220 is shown in block diagram form, but is located within the frame 210. Frame 210 also supports a work element in the form of a lift arm assembly 230 that is powered by the power system 220 and is capable of performing various work tasks. As loader 200 is a work vehicle, frame 210 also supports a traction system 240, which is also powered by power system 220 and is capable of propelling the power machine over a support surface. The lift arm assembly 230 in turn supports an implement interface 270, which includes an implement carrier 272 that is capable of receiving and securing various implements to the loader 200 for performing various work tasks and power couplers 274, to which an implement can be coupled for selectively providing power to an implement that might be connected to the loader. Power couplers 274 can provide sources of hydraulic or electric power or both. The loader 200 includes a cab 250 that defines an operator station 255 from which an operator can manipulate various control devices 260 to cause the power machine to perform various work functions. Cab 250 can be pivoted back about an axis that extends through mounts 254 to provide access to power system components as needed for maintenance and repair.

The operator station 255 includes an operator seat 258 and a plurality of operation input devices, including control levers 260 that an operator can manipulate to control various machine functions. Operator input devices can include buttons, switches, levers, sliders, pedals and the like that can be stand-alone devices such as hand operated levers or foot pedals or incorporated into hand grips or display panels, including programmable input devices. Actuation of operator input devices can generate signals in the form of electrical signals, hydraulic signals, and/or mechanical signals. Signals generated in response to operator input devices are provided to various components on the power machine for controlling various functions on the power machine. Among the functions that are controlled via operator input devices on power machine 100 include control of the tractive elements 219, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such walk behind loaders may not have a cab nor an operator compartment, nor a seat. The operator position on such loaders is generally defined relative to a position where an operator is best suited to manipulate operator input devices.

Various power machines that are capable of including and/or interacting with the embodiments discussed below can have various different frame components that support various work elements. The elements of frame 210 discussed herein are provided for illustrative purposes and frame 210 is not the only type of frame that a power machine on which the embodiments can be practiced can employ. Frame 210 of loader 200 includes an undercarriage or lower portion 211 of the frame and a mainframe or upper portion 212 of the frame that is supported by the undercarriage. The mainframe 212 of loader 200, in some embodiments is attached to the undercarriage 211 such as with fasteners or by welding the undercarriage to the mainframe. Alternatively, the mainframe and undercarriage can be integrally formed. Mainframe 212 includes a pair of upright portions 214A and 214B located on either side and toward the rear of the mainframe that support lift arm assembly 230 and to which the lift arm assembly 230 is pivotally attached. The lift arm assembly 230 is illustratively pinned to each of the upright portions 214A and 214B. The combination of mounting features on the upright portions 214A and 214B and the lift arm assembly 230 and mounting hardware (including pins used to pin the lift arm assembly to the mainframe 212) are collectively referred to as joints 216A and 216B (one is located on each of the upright portions 214) for the purposes of this discussion. Joints 216A and 216B are aligned along an axis 218 so that the lift arm assembly is capable of pivoting, as discussed below, with respect to the frame 210 about axis 218. Other power machines may not include upright portions on either side of the frame, or may not have a lift arm assembly that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements in the form of wheels 219A-D on either side of the loader 200.

The lift arm assembly 230 shown in FIGS. 2-3 is one example of many different types of lift arm assemblies that can be attached to a power machine such as loader 200 or other power machines on which embodiments of the present discussion can be practiced. The lift arm assembly 230 is what is known as a vertical lift arm, meaning that the lift arm assembly 230 is moveable (i.e. the lift arm assembly can be raised and lowered) under control of the loader 200 with respect to the frame 210 along a lift path 237 that forms a generally vertical path. Other lift arm assemblies can have different geometries and can be coupled to the frame of a loader in various ways to provide lift paths that differ from the radial path of lift arm assembly 230. For example, some lift paths on other loaders provide a radial lift path. Other lift arm assemblies can have an extendable or telescoping portion. Other power machines can have a plurality of lift arm assemblies attached to their frames, with each lift arm assembly being independent of the other(s). Unless specifically stated otherwise, none of the inventive concepts set forth in this discussion are limited by the type or number of lift arm assemblies that are coupled to a particular power machine.

The lift arm assembly 230 has a pair of lift arms 234 that are disposed on opposing sides of the frame 210. A first end of each of the lift arms 234 is pivotally coupled to the power machine at joints 216 and a second end 232B of each of the lift arms is positioned forward of the frame 210 when in a lowered position as shown in FIG. 2. Joints 216 are located toward a rear of the loader 200 so that the lift arms extend along the sides of the frame 210. The lift path 237 is defined by the path of travel of the second end 232B of the lift arms 234 as the lift arm assembly 230 is moved between a minimum and maximum height.

Each of the lift arms 234 has a first portion 234A of each lift arm 234 is pivotally coupled to the frame 210 at one of the joints 216 and the second portion 234B extends from its connection to the first portion 234A to the second end 232B of the lift arm assembly 230. The lift arms 234 are each coupled to a cross member 236 that is attached to the first portions 234A. Cross member 236 provides increased structural stability to the lift arm assembly 230. A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm assembly 230 to pivot about joints 216 and thereby be raised and lowered along a fixed path illustrated by arrow 237. Each of a pair of control links 217 are pivotally mounted to the frame 210 and one of the lift arms 232 on either side of the frame 210. The control links 217 help to define the fixed lift path of the lift arm assembly 230.

Some lift arms, most notably lift arms on excavators but also possible on loaders, may have portions that are controllable to pivot with respect to another segment instead of moving in concert (i.e. along a pre-determined path) as is the case in the lift arm assembly 230 shown in FIG. 2. Some power machines have lift arm assemblies with a single lift arm, such as is known in excavators or even some loaders and other power machines. Other power machines can have a plurality of lift arm assemblies, each being independent of the other(s).

An implement interface 270 is provided proximal to a second end 232B of the lift arm assembly 234. The implement interface 270 includes an implement carrier 272 that is capable of accepting and securing a variety of different implements to the lift arm 230. Such implements have a complementary machine interface that is configured to be engaged with the implement carrier 272. The implement carrier 272 is pivotally mounted at the second end 232B of the arm 234. Implement carrier actuators 235 are operably coupled the lift arm assembly 230 and the implement carrier 272 and are operable to rotate the implement carrier with respect to the lift arm assembly. Implement carrier actuators 235 are illustratively hydraulic cylinders and often known as tilt cylinders.

By having an implement carrier capable of being attached to a plurality of different implements, changing from one implement to another can be accomplished with relative ease. For example, machines with implement carriers can provide an actuator between the implement carrier and the lift arm assembly, so that removing or attaching an implement does not involve removing or attaching an actuator from the implement or removing or attaching the implement from the lift arm assembly. The implement carrier 272 provides a mounting structure for easily attaching an implement to the lift arm (or other portion of a power machine) that a lift arm assembly without an implement carrier does not have.

Some power machines can have implements or implement like devices attached to it such as by being pinned to a lift arm with a tilt actuator also coupled directly to the implement or implement type structure. A common example of such an implement that is rotatably pinned to a lift arm is a bucket, with one or more tilt cylinders being attached to a bracket that is fixed directly onto the bucket such as by welding or with fasteners. Such a power machine does not have an implement carrier, but rather has a direct connection between a lift arm and an implement.

The implement interface 270 also includes an implement power source 274 available for connection to an implement on the lift arm assembly 230. The implement power source 274 includes pressurized hydraulic fluid port to which an implement can be removably coupled. The pressurized hydraulic fluid port selectively provides pressurized hydraulic fluid for powering one or more functions or actuators on an implement. The implement power source can also include an electrical power source for powering electrical actuators and/or an electronic controller on an implement. The implement power source 274 also exemplarily includes electrical conduits that are in communication with a data bus on the excavator 200 to allow communication between a controller on an implement and electronic devices on the loader 200.

Figure 4:
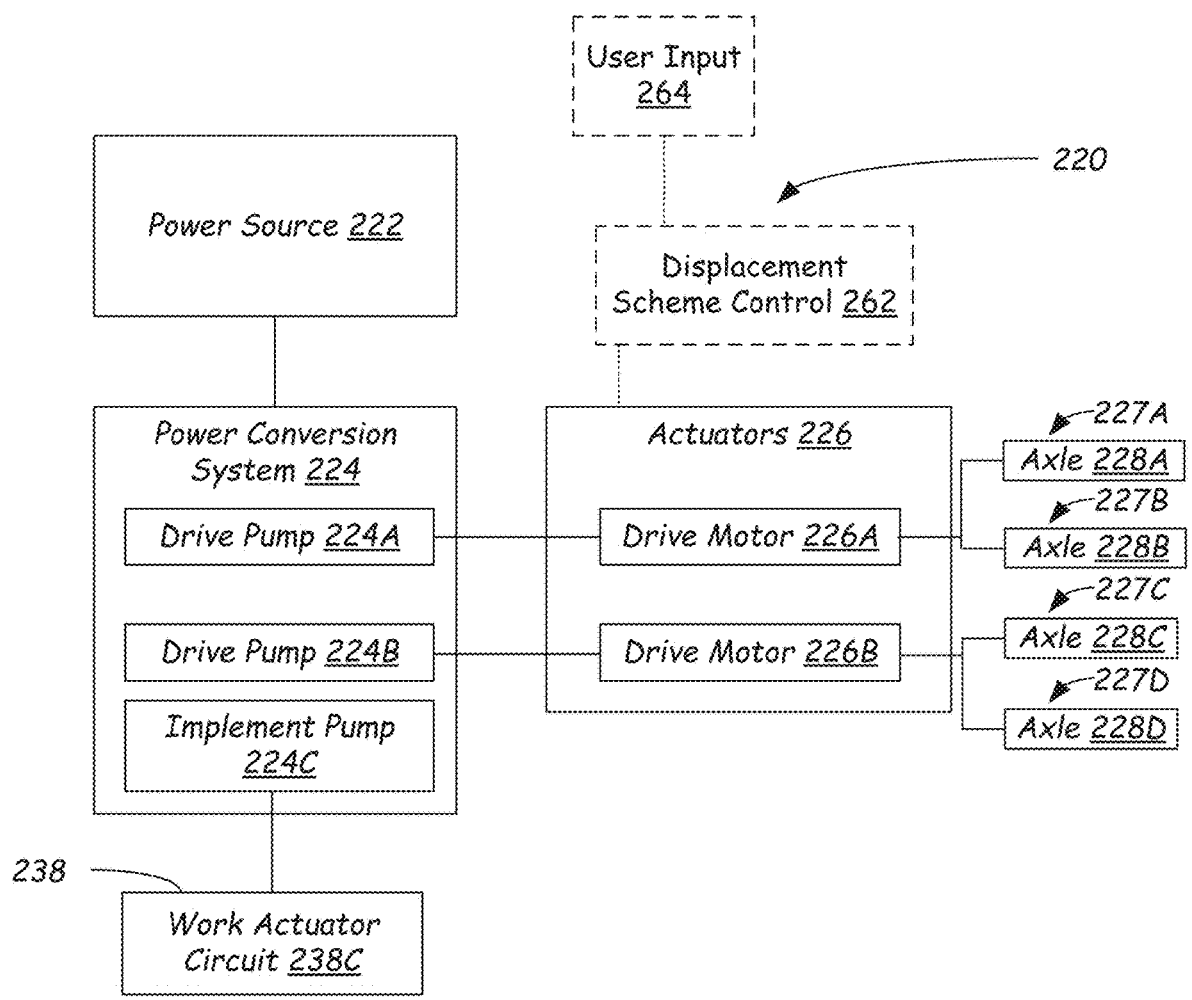
FIG. 4 is a block diagram illustrating components of a power system of a loader such as the loader illustrated in FIGS. 2-3.

Frame 210 supports and generally encloses the power system 220 so that the various components of the power system 220 are not visible in FIGS. 2-3. FIG. 4 includes, among other things, a diagram of various components of the power system 220. Power system 220 includes one or more power sources 222 that are capable of generating and/or storing power for use on various machine functions. On power machine 200, the power system 220 includes an internal combustion engine. Other power machines can include electric generators, rechargeable batteries, various other power sources or any combination of power sources that are capable of providing power for given power machine components. The power system 220 also includes a power conversion system 224, which is operably coupled to the power source 222. Power conversion system 224 is, in turn, coupled to one or more actuators 226, which are capable of performing a function on the power machine. Power conversion systems in various power machines can include various components, including mechanical transmissions, hydraulic systems, and the like. The power conversion system 224 of power machine 200 includes a pair of hydrostatic drive pumps 224A and 224B, which are selectively controllable to provide a power signal to drive motors 226A and 226B. The drive motors 226A and 226B in turn are each operably coupled to axles, with drive motor 226A being coupled to axles 228A and 228B and drive motor 226B being coupled to axles 228C and 228D. The axles 228A-D are in turn coupled to tractive elements such as wheels 219A-D, respectively. Each of the axles 228A-D are part of axle assemblies 227A-D, which can include axle tubes, in which the axles are carried and a hub, which is attached to the axles. The letter suffices on these references refer to the positions of the axles and axle assemblies on the loader. They can also be referred to individually and collectively as axle 288 and axle assembly 227. The hub provides an interface for tractive elements that are to be operably coupled to the axles. As discussed further below, the wheeled type tractive elements 219A-D can be replaced with track assembly type tractive elements 419A-D to convert the wheeled skid-steer loader into a quad track skid-steer loader. The drive pumps 224A and 224B can be mechanically, hydraulically, and/or electrically coupled to operator input devices to receive actuation signals for controlling the drive pumps.

In some embodiments, the drive motors 226A and 226B can be variable displacement motors having two or more speeds. For instance, drive motors can be controlled to selectively operate in a low range mode having high-displacement and in a high range mode having low-displacement. It may be desirable, in some embodiments, to allow variable displacement of the drive motors in some configurations, but not in others. For instance, it may be desirable to allow variable displacement with low and high ranges when track assembly type tractive elements are mounted to the axle assemblies of the power machine, but prevent variable displacement when wheels are mounted to the axle assemblies of the machine. One situation where this may be advantageous is where a drive sprocket in the track assembly is such that a single rotation of the sprocket will effectuate less movement of the loader than a single rotation of a wheel. Providing a variable displacement motor when track assembly type tractive assemblies are used would increase the top speed of the loader so that it is compatible with that when wheeled tractive elements are used (by selecting the high range while moving) while at the same time providing suitable tractive effort in high load conditions (by selecting the low range while moving). In other embodiments, some sizes of loaders may allow variable displacement when using wheel type tractive elements, while other sizes of loaders may prevent or limit variable displacement when using wheel type tractive elements. To accomplish desired control of the variable displacement in some embodiments, different displacement schemes can be implemented based upon whether the mounted tractive elements are wheels or track assemblies.

As shown in FIG. 4, displacement scheme controller 262 can optionally be included to implement a first displacement control scheme when wheels are mounted on the power machine, and to implement a second displacement control scheme when track assemblies are mounted on the power machine. The displacement control 262 can be implemented for example in machine controllers and can be responsive to, for example, a switch or other user input 264 in the cab or operator compartment which allows the operator to indicate which type of tractive element is being used such that the corresponding control scheme is automatically implemented. Other techniques of selecting the displacement control scheme can be used instead, including automatic detection of tractive element type.

The arrangement of drive pumps, motors, and axles in power machine 200 is but one example of an arrangement of these components. As discussed above, power machine 200 is a skid-steer loader and thus tractive elements on each side of the power machine are controlled together via the output of a single hydraulic pump, either through a single drive motor as in power machine 200 or with individual drive motors. Various other configurations and combinations of hydraulic drive pumps and motors can be employed as may be advantageous.

The power conversion system 224 of power machine 200 also includes a hydraulic implement pump 224C, which is also operably coupled to the power source 222. The hydraulic implement pump 224C is operably coupled to work actuator circuit 238C. Work actuator circuit 238 includes lift cylinders 238 and tilt cylinders 235 as well as control logic (such as one or more valves) to control actuation thereof. The control logic selectively allows, in response to operator inputs, for actuation of the lift cylinders and/or tilt cylinders. In some machines, the work actuator circuit also includes control logic to selectively provide a pressurized hydraulic fluid to an attached implement.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as track loader 200, unless otherwise noted or recited, the concepts discussed below are not intended to be limited in their application to the environments specifically described above.

Figure 5:
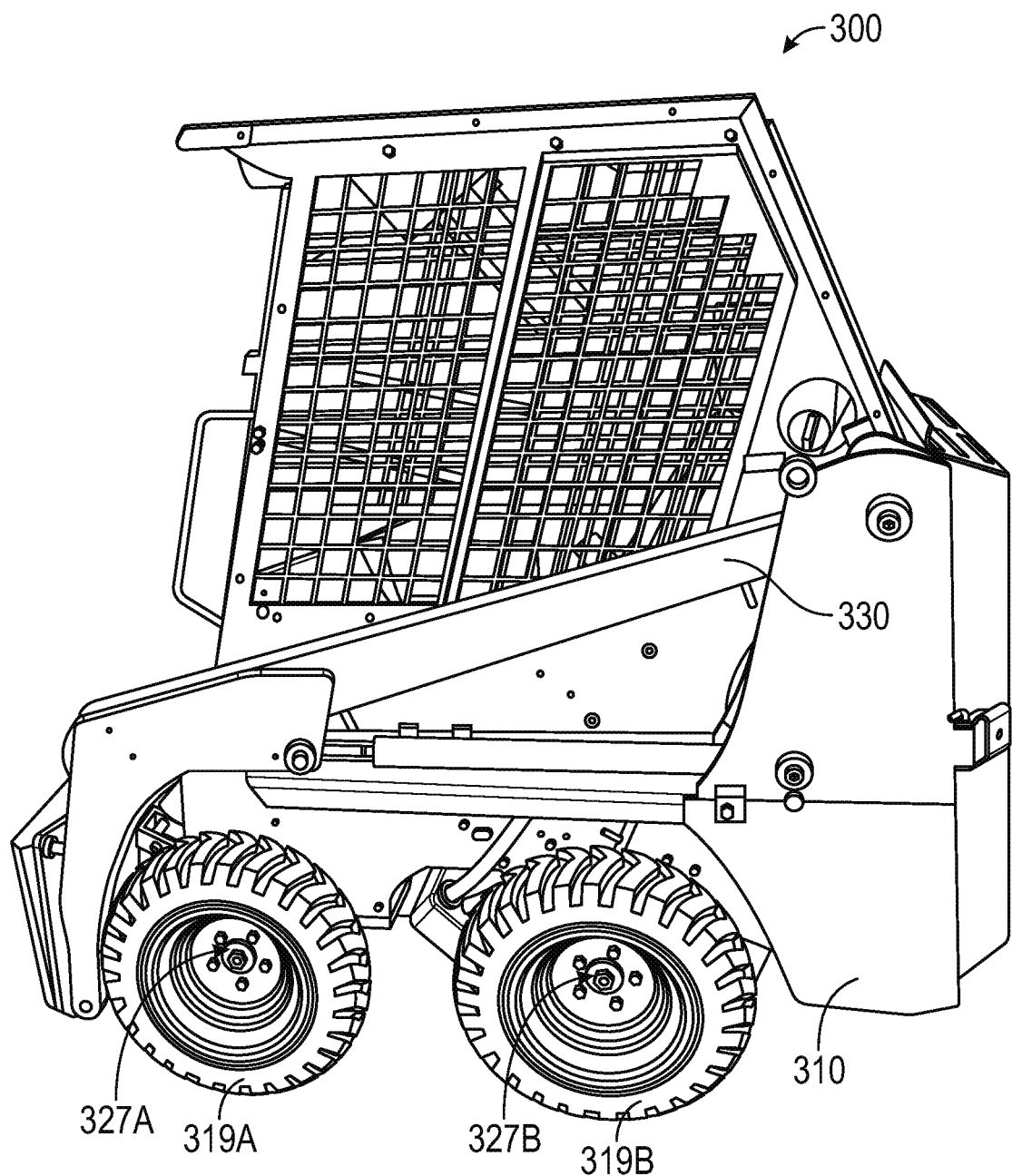
FIG. 5 is a side perspective view of another wheeled skid-steer loader illustrating features utilized in providing a quad track skid-steer loader.

Referring now to FIG. 5, shown is a loader 300, which is another particular example of a power machine of the type illustrated in FIG. 1 where the embodiments discussed below can be advantageously employed Like loader 200, loader 300 is a skid-steer loader, which is a loader that has tractive elements 319A-319D (in this case, four wheels) that are mounted to the frame 310 of the loader via rigid axles 328A-328D. Loader 300 differs from loader 200 in that lift arm assembly 330 is a radial lift arm, meaning that the lift arm assembly 330 is moveable (i.e. the lift arm assembly can be raised and lowered) under control of the loader 300 with respect to the frame 310 along a lift path that forms a generally radial path. Various types of lift arm assemblies can be employed on different embodiments of loaders without departing from the scope of this discussion.

Figure 6:
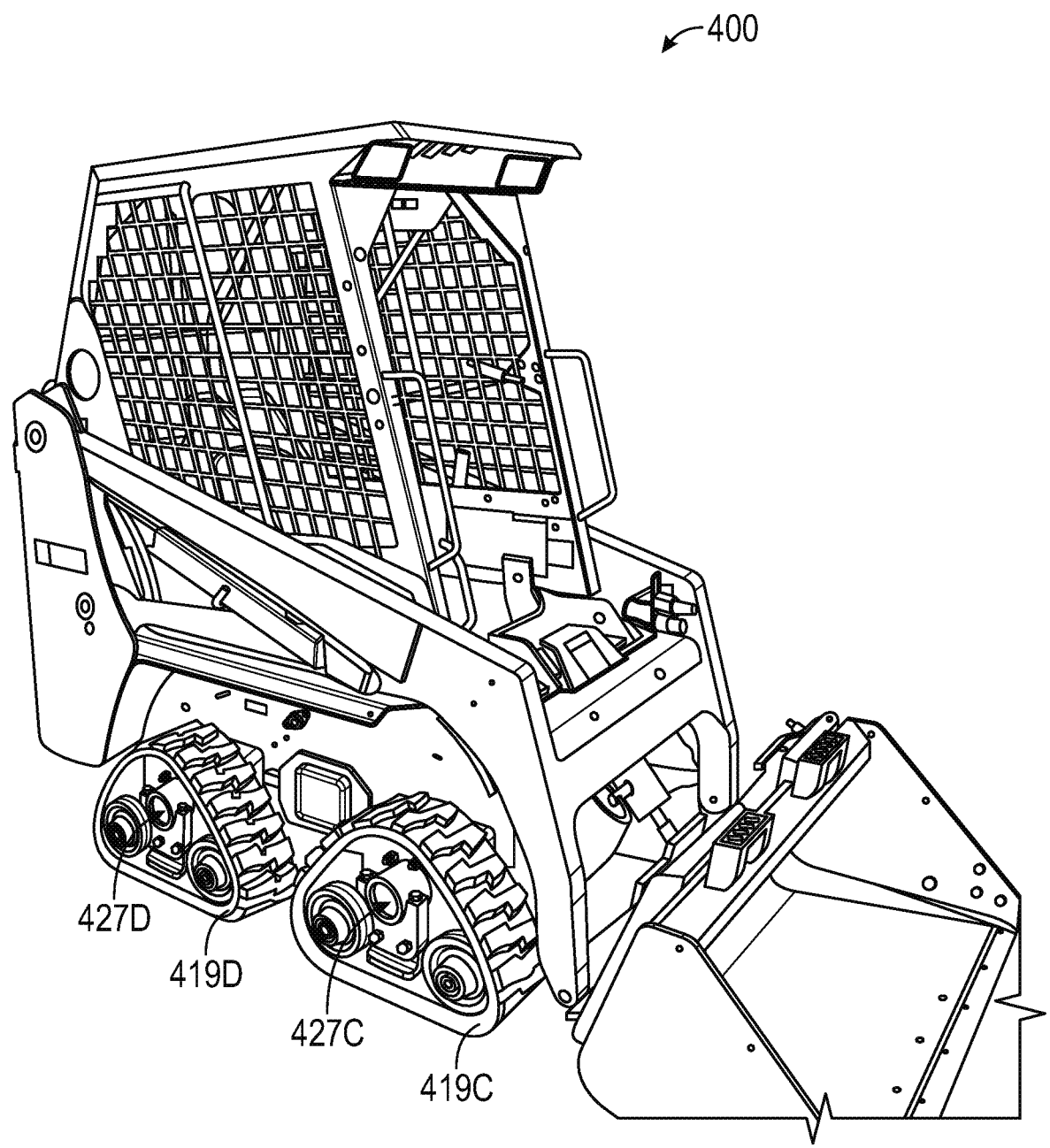
FIG. 6 is a side perspective view of the skid-steer loader shown in FIG. 5, converted to a quad-track skid-steer loader.

Loader 300 includes similar components to those discussed above with reference to loader 200, and therefore the discussion of these components is not repeated. For example, some or all of the features of the power system 220 of loader 200 are applicable to loader 300 as well, and loader 300 should be understood to include such a power system or one that is similar. In particular, loader 300 includes a power system with a single drive motor on each side of the machine that powers, in concert, each of the tractive elements on its side of the loader. More particularly, loader 300 includes four axles, as mentioned above, and two drive motors, with each drive motor powering two axles. Loader 300 is used as an example of a skid-steer loader in which the tractive element wheels 319A-319D can be replaced with track assemblies 419A-419D (shown in FIGS. 6-8) mounted to axle assemblies 327A-327D. FIG. 6 illustrates a loader 400, which is a quad track skid-steer loader. Like loader 300, loader 400 has four axle assemblies (with axle assemblies 427C and 427D referred to generally in FIG. 6), with track assemblies 419A-419D attached to the axle instead of wheels. In other words, the track assemblies are a direct replacement for the wheel assemblies of loader 300. The power system of loader 400 can be identical to that of loader 300. This allows for the possibility of loader 300 being converted from a skid-steer loader to a quad track skid-steer loader simply by removing the wheels and replacing them with track assemblies.

Figure 7:
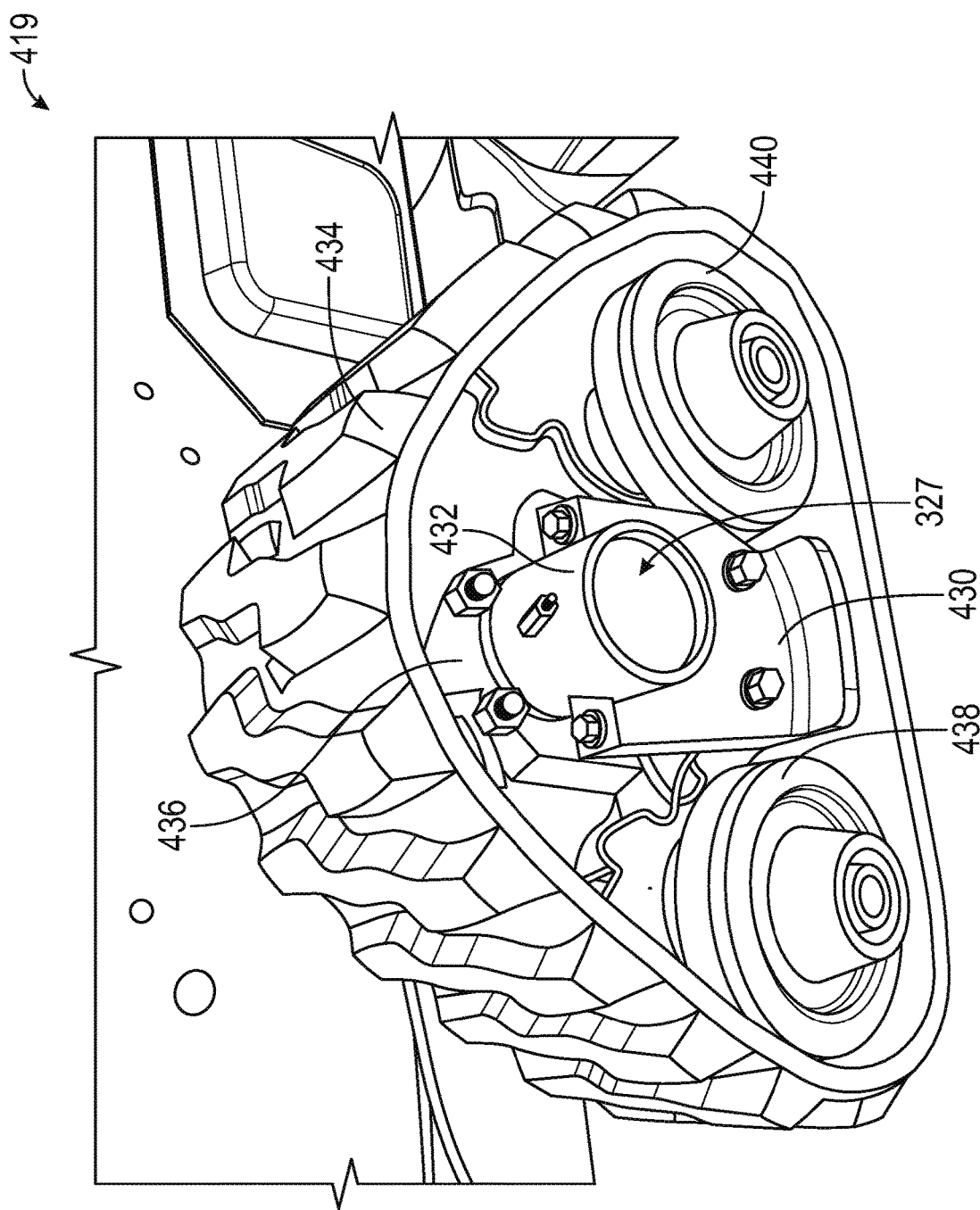
FIG. 7 is a perspective view of a track assembly configured to mount on an axle assembly of a skid-steer loader in accordance with an exemplary embodiment.

FIG. 7 illustrates one type of track assembly 419 that can be used with loader 400 (or loader 300 to convert it to a quad track loader). Track assembly 419 is representative of any suitable track assembly that can be employed. Track assembly 419 has a frame 430 providing an axle interface 432 configured to be engaged with axles 328A-D in FIG. 5 or attached to axles 428A-D in FIG. 6. Frame 430 can be bolted onto the power machine (such as by being bolted onto an axle tube of the axle assemblies 327 or 427) or otherwise secured. Track assembly 419 also includes a track 434, a sprocket 436 configured to drive the track, and a pair of idlers 438 and 440 configured to tension the track on the track frame 430. Rotation of axles by a corresponding connected drive motor (e.g., drive motor 226A or drive motor 226B as shown in FIG. 4) causes rotation of sprocket 436 and corresponding movement of track 434. The track assemblies themselves are each capable of rotating about an axis that extends through the axle assembly to which a given track assembly is coupled. This advantageously allows for the track assemblies to move over obstructions without impacting the overall stability of the loader. As will be discussed below, stops are provided to limit the overall rotation of the track assemblies.

Figure 8:
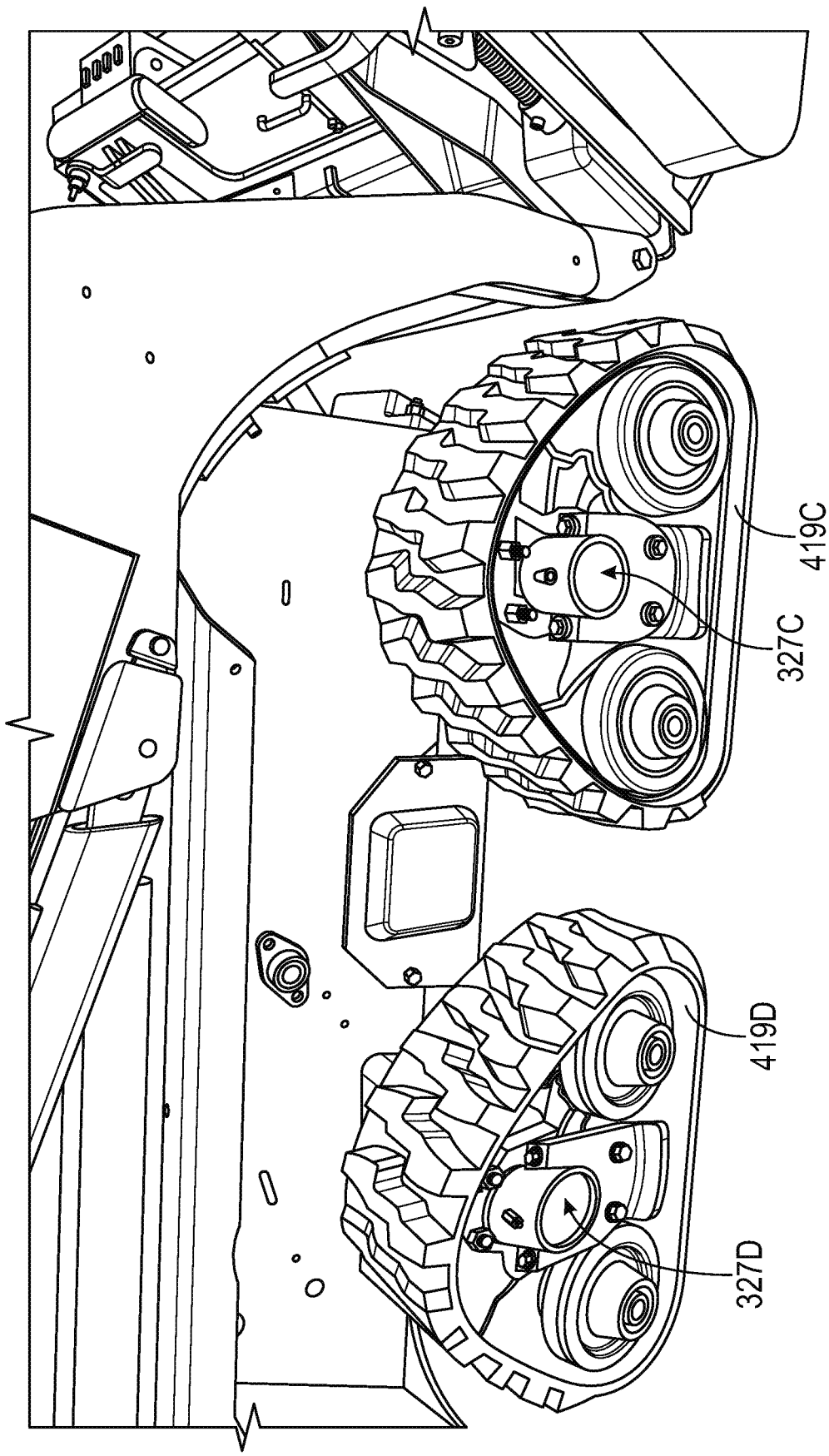
FIG. 8 is a perspective view of two track assemblies mounted on the axle assemblies of one side of the skid-steer loader shown in FIG. 5 in place of the wheels.

FIG. 8 illustrates in greater detail a pair of track assemblies 419C and 419D mounted on axles 328C and 328D of power machine 300. Of particular note, as both of axles 328C and 328D are driven by a single drive motor (e.g., drive motor 226B shown in FIG. 4), the single drive motor drives or powers both of the track assemblies on a particular side of the loader. The track assemblies (not shown in FIG. 8) on the opposite side of the machine are similarly both driven by a single drive motor (e.g. 226A). Utilizing track assemblies which can each be mounted on a different axle of a skid-steer loader and driven in pairs by a single drive motor for each side of the machine, allows conversion of existing skid-steer loaders into quad track skid-steer loaders, thus providing the advantages of a skid-steer loader while also providing at least some of the advantages of a track loader.

Figure 9:
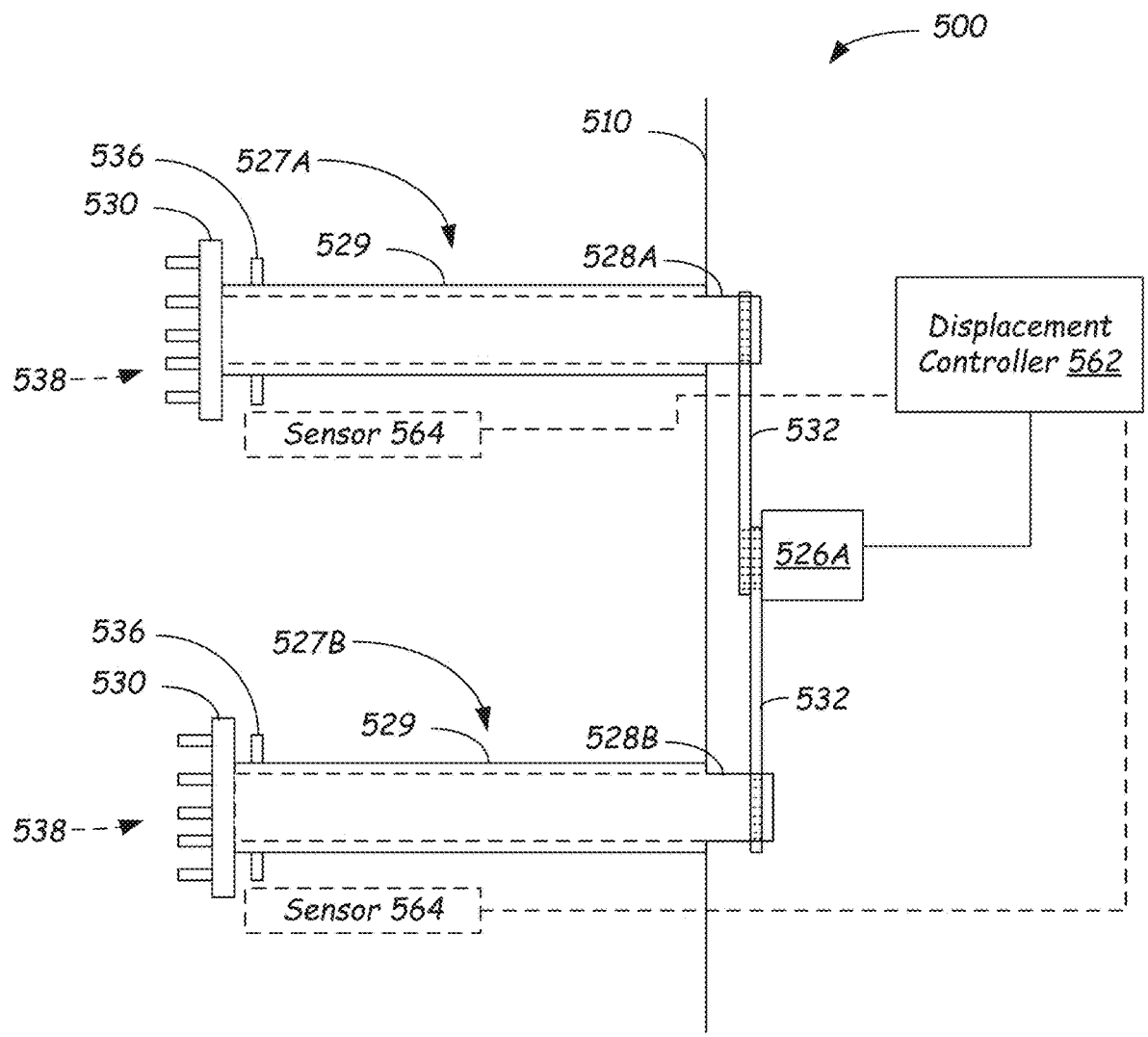
FIG. 9 is a simplified top view diagram of axle assemblies on a loader configured to be able to accept either wheels or quad track assemblies according to one illustrative embodiment.

FIG. 9 is a simplified top view diagram illustrating a portion of a loader 500 showing axle assemblies that are suitable for receiving quad tracks and wheels according to one illustrative embodiment. Loader 500 can be similar to or the same as loaders 300 and 400. Shown in FIG. 9 is a portion of a frame 510 of loader 500, with a pair of axle assemblies 527A and 527B (the A and B represent positions of the axle assemblies on the loader, they can individually and collectively also be referred to simply as 527), each of which includes an axle tube 529 in which the axles are carried and a hub 530, each of which is fixed to, and moves with, axles 528A and 528B (the A and B represent positions of the axles on the loader, they can individually and collectively also be referred to simply as 528). A drive motor 526 is operably coupled to the axles 528A and 528B such as via chains 532. In some embodiments, drive motor 526 is a variable displacement motor. Although not shown, loader 500 has a similar arrangement of a drive motor and axle assemblies on an opposing side of the frame 510.

A displacement controller 562 is provided that is in communication with the drive motor 526 operates as a control mechanism to select an appropriate displacement for the drive motor, given the tractive elements that are coupled to the machine. Although not shown for simplicity's sake, in various embodiments, the displacement controller can provide a signal to various components such as solenoid valves that in turn provide signals (such as pressurized hydraulic fluid) to control drive motor displacement. In some embodiments, the displacement controller 562 determines the correct displacement based on an input from a user that signals what type of tractive elements are coupled to the axles. Alternatively, displacement controller 562 can determine the type of tractive elements that are coupled to the axles via one or more sensors 564, which are capable of sensing the difference between a wheeled tractive element and a track assembly. Sensors 564 can be any type of contact, non-contact, wireless or any other sensor that can sense some structural feature to distinguish between the various types of tractive elements. Controller 562 can be an electronic controller capable of executing stored instructions. In some embodiments, control mechanism can be a simple electrical signal provided via a user actuated switch. In still other embodiments, the drive motor 526 is not a variable displacement motor.

Hubs 530 are fixedly coupled to each of the axles 528. The hubs have a plurality of attachment features 538 such as studs that can accept the tractive elements there on. The attachment features 538 are sized to be able to accept both a wheel or a track assembly. Each axle assembly also has an anti-rotation device 536 that is, in some embodiments coupled to each axle assembly 527. The anti-rotation device is sized and shaped to engage a portion of its respective track assembly to limit the overall rotation of the track assembly.

Figure 10:
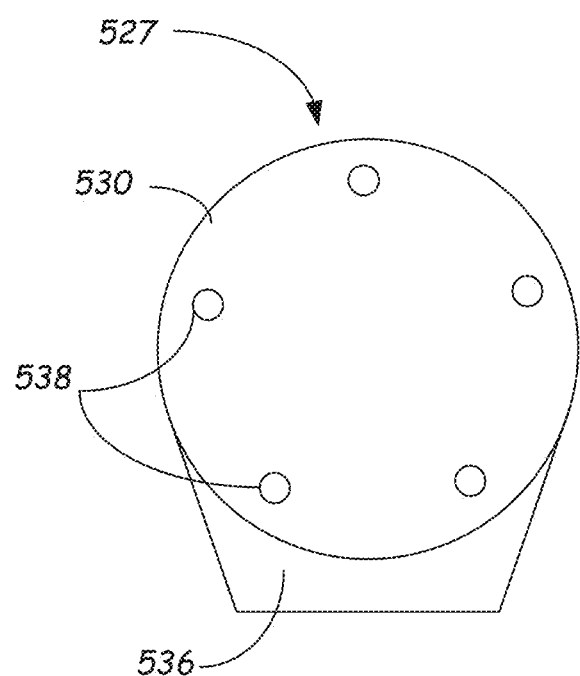
FIG. 10 is a simplified side elevation diagram of an axle assembly, showing an arrangement of mounting features and anti-rotation stops according to one illustrative embodiment.

FIG. 10 provides a side elevation view of one of the axle assemblies 527. Hub 530 is shown with a plurality of mounting studs 538 evenly spaced about the hub. The studs 538 can accept either a wheel or a track assembly. Stop 536 is provided to engage a track assembly and limit overall rotation of the track assembly. Stop 536 is, in some embodiments fixed to the axle assembly 537 such as by being welded to the axle tube. The stop 536 is these embodiments can be present regardless of whether the track assemblies are coupled to the axle assembly 537. In other embodiments, the stop 536 can be removably attached to the axle assembly 537, which can be advantageous when converting a previously assembled wheeled loader into a quad track loader.

Although the present invention has been described with reference to preferred embodiments, workers skilled in the art will recognize that changes may be made in form and detail without departing from the scope of the discussion.

What is claimed is:

1. A power machine comprising:
  a frame having first and second opposing sides, each extending in a direction from a front of the power machine to a rear of the power machine;
  a cab mounted on the frame;
  a lift arm assembly pivotally coupled to the frame rearward of at least a portion of the cab and extending forward of the frame;
  a first axle assembly and a second axle assembly each having an axle tube with an axle positioned therein and each disposed on the first side of the frame;
  a first track assembly operably coupled to the first axle and a second track assembly operably coupled to the second axle on the first side of the frame;
  a first drive motor operably coupled to each of the first and second axles and configured to rotate the first and second axles to drive the first and second track assemblies;
  a third axle assembly and a fourth axle assembly each having an axle tube with an axle positioned therein and each disposed on the second side of the frame;
  a third track assembly operably coupled to the third axle and a fourth track assembly operably coupled to the fourth axle on the second side of the frame;
  a second drive motor operably coupled to each of the third and fourth axles and configured to rotate the third and fourth axles to drive the third and fourth track assemblies;
  wherein each of the first track assembly, the second track assembly, the third track assembly and the fourth track assembly comprises:
    a track frame providing an axle interface configured to engage and be attached to a corresponding one of the axles;
    a track supported by the track frame;
    a sprocket configured to drive the track around the track frame; and
    an idler configured to tension the track on the track frame; and
  wherein the power machine further comprises a plurality of anti-rotation devices each having a stop positioned to engage a different one of the first track frame, second track frame, third frame, and fourth frame, wherein the stop of each of the plurality of anti-rotation devices is fixed directly to and extends from a corresponding one of the first axle assembly, the second axle assembly, the third axle assembly and the fourth axle assembly, the stop of each of the plurality of anti-rotation devices extending toward the track of a corresponding track assembly mounted on the corresponding axle to engage the corresponding track assembly such that the corresponding track assembly is allowed to rotate until engagement with the corresponding stop.

2. The power machine of claim 1, and further comprising a first drive pump selectively controllable to provide a power signal to the first drive motor and a second drive pump selectively controllable to provide a power signal to the second drive motor.

3. The power machine of claim 1, and further comprising first, second, third and fourth hubs each mounted to a respective one of the first axle, second axle, third axle and fourth axle, wherein each of the plurality of hubs is configured to mount, one at a time, both of a wheel and a track assembly to the corresponding axle such that the power machine can be changed between using wheel type tractive elements and track assembly type tractive elements.

4. The power machine of claim 1, wherein each of the plurality of anti-rotation devices is configured to be removably mounted to the axle tube such that the anti-rotation device can be removed when a wheel is mounted on the corresponding axle instead of a track assembly.

5. A power machine comprising:
  a frame having first and second opposing sides, each extending in a direction from a front of the power machine to a rear of the power machine;
  a lift arm assembly pivotally coupled to the frame and extending forward of the frame;

a first axle assembly having a first axle and a second axle assembly having a second axle both on the first side of the frame;
a third axle assembly having a third axle and a fourth axle assembly having a fourth axle both on the second side of the frame; and
a plurality of hubs each mounted to a different one of the first axle, second axle, third axle and fourth axle, wherein each of the plurality of hubs has a mounting structure that is configured to accept and secure thereto, one at a time, both a wheel type tractive element and a track assembly type tractive element to the corresponding axle such that the power machine can be converted between using the wheel type tractive elements and the track assembly type tractive elements; and
a first drive motor coupled to the first and second axles and configured to rotate the first and second axles to drive the wheel type tractive elements or track assembly type tractive elements mounted to the first and second axles;
a second drive motor coupled to the third and fourth axles and configured to rotate the third and fourth axles to drive the wheel type tractive elements or track assembly type tractive elements mounted to the third and fourth axles; and
a plurality of anti-rotation devices each mounted directly to, and extending from, a different one of the first, second, third, and fourth axle assemblies, each anti-rotation device extending toward a track of the corresponding track assembly type tractive element mounted on the corresponding axle and configured to engage the corresponding track assembly type tractive element to limit overall rotation of the track assembly type tractive element.

6. The power machine of claim 5, wherein each of the plurality of anti-rotation devices is configured to be removably mounted to the axle assembly such that the anti-rotation device can be removed when a wheel type tractive element is mounted on the corresponding axle.

7. A power machine comprising:
a frame having first and second opposing sides, each extending in a direction from a front of the power machine to a rear of the power machine;
a cab mounted on the frame;
a lift arm assembly pivotally coupled to the frame rearward of at least a portion of the cab and extending forward of the frame;
a first axle assembly having a first axle and a second axle assembly having a second axle both on the first side of the frame;
a third axle assembly having a third axle and a fourth axle assembly having a fourth axle both on the second side of the frame;
a plurality of hubs each mounted to a different one of the first axle, second axle, third axle and fourth axle, wherein each of the plurality of hubs is configured to mount, one at a time, both of a wheel type tractive element and a track assembly type tractive element to the corresponding axle such that the power machine can be changed between using the wheel type tractive elements and the track assembly type tractive elements;
a plurality of anti-rotation devices each mounted directly to a different one of the first, second, third, and fourth axle assemblies, wherein each of the plurality of anti-rotation devices extends from the corresponding different one of the first, second, third, and fourth axle assemblies toward a track of a track assembly type tractive element mounted on the corresponding axle to engage and limit overall rotation of the track assembly;
a first variable displacement drive motor coupled to the first and second axles and configured to rotate the first and second axles to drive the wheel type tractive elements or track assembly type tractive elements mounted to the first and second axles;
a second variable displacement drive motor coupled to the third and fourth axles and configured to rotate the third and fourth axles to drive the wheel type tractive elements or track assembly type tractive elements mounted to the third and fourth axles; and
a control mechanism configured to control the first and second variable displacement drive motors using a first displacement control scheme when wheel type tractive elements are mounted to the axles, and to control the first and second variable displacement drive motors using a second displacement control scheme when track assembly type tractive elements are mounted to the axles, the first displacement control scheme being different than the second displacement control scheme.

8. The power machine of 7, wherein the control mechanism is configured to control the first and second variable displacement drive motors using the first displacement control scheme when wheel type tractive elements are mounted to the axles to prevent variable displacement of the first and second variable displacement drive motors, and to control the first and second variable displacement drive motors using the second displacement control scheme when track assembly type tractive elements are mounted to the axles to allow variable displacement of the first and second variable displacement drive motors.

9. The power machine of claim 8, wherein the first displacement control scheme limits the first and second variable displacement drive motors to low range, high displacement operation.

10. The power machine of claim 8, wherein the second displacement control scheme allows both low range, high displacement operation and high range, low displacement operation of the first and second variable displacement drive motors.

11. The power machine of claim 7, and further comprising a user input in communication with the control mechanism and configured to allow an operator to indicate a type of tractive element mounted on the axles to control which of the first and second displacement control schemes is implemented by the displacement controller.

* * * * *